United States Patent [19]

Blechinger et al.

[11] 4,455,877

[45] Jun. 26, 1984

[54] VORTEX SHEDDING MASS AIR FLOW SENSOR WITH STABILIZED FLUID FLOW

[75] Inventors: Chester J. Blechinger, Bloomfield Hills; Louis R. Focht, Farmington Hills, both of Mich.

[73] Assignee: Ford Motor Company, Dearborn, Mich.

[21] Appl. No.: 429,575

[22] Filed: Sep. 30, 1982

[51] Int. Cl.³ .............................................. G01F 1/32
[52] U.S. Cl. .................................................. 73/861.22
[58] Field of Search ......................... 73/861.22, 861.24

[56] References Cited

U.S. PATENT DOCUMENTS

| | | |
|---|---|---|
| 3,116,639 | 1/1964 | Bird . |
| 3,572,117 | 3/1971 | Rodely ............................. 73/861.22 |
| 3,680,375 | 8/1972 | Joy et al. . |
| 4,074,571 | 2/1978 | Burgess ............................. 73/861.24 |
| 4,307,619 | 12/1981 | Herzl ................................. 73/861.22 |
| 4,385,526 | 5/1983 | Huthloff ........................... 73/861.22 |

FOREIGN PATENT DOCUMENTS 5282018  6/1980  Japan ................................ 73/861.22

Primary Examiner—Herbert Goldstein
Attorney, Agent, or Firm—Peter Abolins; Robert D. Sanborn

[57] ABSTRACT

A device for measuring the velocity of fluid includes a vortex generating means positioned in the fluid stream so that vortices are formed in the wake of the generating means. Plates elongated in the direction of fluid flow are positioned adjacent the vortex generating means to improve detection of the vortices by increasing the signal to noise ratio.

6 Claims, 4 Drawing Figures

VORTEX SHEDDING MASS AIR FLOW SENSOR WITH STABILIZED FLUID FLOW

BACKGROUND OF THE INVENTION

1. Field of the Invention

This invention relates to measurement of fluid flow.

2. Prior Art

Various apparatus for the measurement of fluid velocity are known. First, a system for measuring the relative velocity between a body and the contiguous fluid includes an impeller or rotor which is rotatably pivoted on the body immersed in the fluid. Flow of the fluid relative to the body causes the impeller or rotor to rotate with an angular velocity dependent on the relative velocity between the body and the fluid. This rotation may operate, by electrical or mechanical means, an indicator which is suitably calibrated to indicate relative velocity. Disadvantages of such an arrangement include that the angular velocity of the impeller or rotor is not accurately proportional to the relative velocity between the fluid and the body.

An apparatus related to the previously discussed impeller rotor is a vane-like obstruction in the fluid path. The amount of deflection of the vane is proportional to the fluid velocity. Deflection of the vane can be sensed by any of a variety of means such as movement of a slider along a resistance thereby varying the resistance proportional to vane deflection.

Also known are hot wire fluid flow sensors wherein the motion of the fluid past a heated wire cools the wire. The amount of cooling is dependent upon the amount of fluid flowing past the wire. Thus, a hot wire fluid flow sensor can measure the mass of the fluid flowing past the sensor. It is advantageous to know the mass of the air entering an internal combustion engine when establishing an air fuel ratio. The amount of cooling of the wire can be determined by a resistance change which can be measured in any number of ways. Disadvantages of such an apparatus include that various impurities in the fluid may be deposited on the wire and cause an erroneous indication of fluid mass flow.

Another method of determining fluid velocity uses an object placed in the fluid flow to create a fluctuating fluid, i.e., Karman vortices. Alternatively, vanes can be placed in the fluid flow to induce a swirl having a cork screw shape. The passage of the ridges and troughs of the cork screw are an indication of fluid velocity.

It is known that the Karman vortices tend to be formed on the downstream side of the object at regular intervals and alternately, first behind one side or edge of the object and then behind the opposite side or edge. The vortices detach themselves from the object in two nearly parallel rows and are carried downstream at a velocity substantially proportional to, but somewhat less than, the relative velocity of the fluid. That is, the vortices have a slip velocity which tends to bear a constant ratio to the velocity of the fluid. It is also well known that in each row the vortices are formed at a distance apart which tends to bear a constant ratio to the size of the object but substantially independent of the relative velocity of the fluid. From these considerations it has been shown that the frequency at which vortices are formed behind either side or edge of a cylinder tends to be proportional to the relative velocity of the fluid and inversely proportional to the size of the cylinder, but to depend substantially upon no other factor or parameter.

The phenomenon of alternate vortex formation in two rows in this way occurs frequently in the natural world, and is known to be the cause of, for example the "singing" of telegraph wires in the wind, the "sighing" and "roaring" of wind in trees, and the "whistling" of wind through tall grasses.

However, reliable, accurate and inexpensive measurement of these vortices to determine fluid flow has presented a problem. For example, U.S. Pat. No. 3,116,639 issued to W. G. Bird teaches positioning a vane-like element mounted for oscillatory movement about an axis extending at right angles to the direction of flow of the fluid and positioned downstream of the vortex generator. The frequency of oscillation of the vane-like element is measured and is related to the frequency with which vortices pass the element. The response time of such a system is, of course, related to the mechanical response of the system. That is, the vane-like element may not be able to respond to the changes in velocity. Further, the strength of the vortices must be sufficiently strong to cause movement of the vane-like element.

Another method and apparatus for determining the passage of a vortice is taught in U.S. Pat. No. 3,680,375 issued to R. D. Joy et al. A sonic signal transmitting transducer is located on one side of the wake of vortices and a sonic signal receiving transducer is located on the other side of the wake. The transmitting transducer signal is modulated by the Karman vortices and received by the receiving transducer. An electronic signal detector is connected to the signal receiving transducer for detecting the modulations created by the Karman vortices. Here again, the vortices must be of sufficient magnitude to cause modulation of the sonic signal. Further, modulation of a sonic signal may occur due to disturbances in the fluid flow other than vortices thus causing erroneous signals. Still further, relatively complex electronics is required to properly process modulation of the sonic signal to determine if a vortice has passed.

Also shown is a device for measuring the velocity of fluid including a vortex generating means, a pressure sensor means and processing means. The vortex generating means is positioned in a fluid stream so that vortices are formed in the wake of the generating means. The pressure sensor means is positioned in the wake of the generating means for sensing a pressure variation caused by the passage of the vortices. The processing means is coupled to the pressure sensor means for determining the fluid flow rate as a function of pressure changes sensed by the pressure sensor means.

However, such methods of flow measurement using variations in pressure or ultrasonic signals are sensitive to velocity or pressure fluctuations in the fluid stream due to the turbulence in the fluid stream. Thus a high signal level from the vortex, compared to the noise level from the turbulence, is desirable. These are some of the problems this invention overcomes.

SUMMARY OF THE INVENTION

This invention recognizes that the signal to noise ratio in a vortex shedding mass air flow meter can be improved by inserting a plate parallel to the direction of fluid flow in the flow meter. For example, an improvement can be achieved by inserting two parallel plates located symmetrically about the vortex generator. Also, the addition of two splitter plates located directly downstream of the generating edges of the vortex generator improves the signal to noise ratio. Still further, a splitter plate just upstream of the vortex generator also improves the signal to noise ratio. These plates can also be used in combination to improved the signal to noise ratio. Such improvement provides an increase in the useful range of the flow meter. The useful range of a meter is the range between the minimum flow and the maximum flow which can be measured. In automotive applications, a large flow range sensor would permit the use of only one sensor for more than one engine size.

DETAILED DESCRIPTION OF INVENTION

Figure 1:
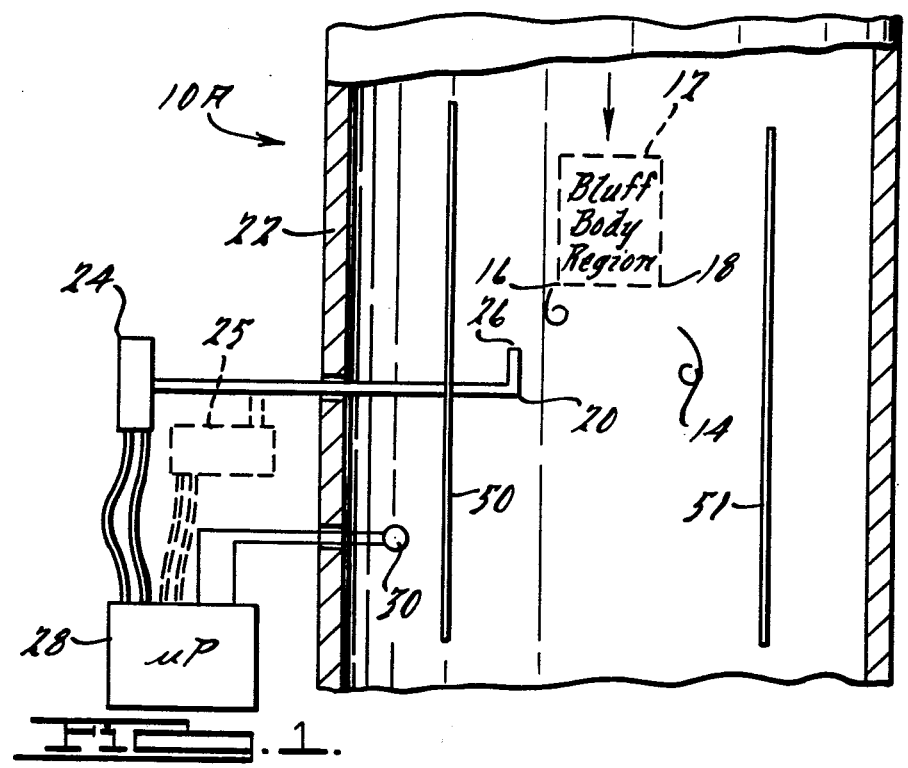
FIG. 1 is a cross section, partly block, view of a velocity and mass air flow sensor in accordance with an embodiment of this invention including a pair of parallel plates spaced about a vortex generator.

Referring to FIGS. 1 through 4, a mass air flow sensor 10 (A, B, C, D, respectively) includes a vortex generator 12 positioned in the air flow. Vortex generator 12 is generally an elongated member transverse to the direction of air flow and can have any of a number of cross sectional configurations such as the rectangular one shown. Vortex generator 12 creates vortices 14 off the two sides 16 and 18 of vortex generator 12. A pitot tube 20 is positioned downstream of vortex generator 12 and is coupled through a wall 22 of mass air flow meter 10 to a pressure transducer 24. Pitot tube 20 is generally a hollow cylinder which conveys pressure variations at the opening 26 of pitot tube 20 to pressure transducer 24. Pressure transducer 24 takes the pressure variations sensed by pitot tube 20 and changes them to electrical signals which are applied to a microprocessor 28. Additionally, a temperature sensor 30 is positioned within wall 22 and coupled to microprocessor 28.

It is desirable to improve detection of the pressure variations by having a large signal to noise ratio. In accordance with this invention, it has been found experimentally that the signal to noise ratio can be substantially improved by the modification of the fluid flow passage by the insertion of plates. For example, two parallel symmetric plates 50 and 51 (FIG. 1) are positioned symmetrically about vortex generator 12. The plates are elongated in a direction of air flow and are relatively thin in comparison to their longitudinal length.

Figure 2:
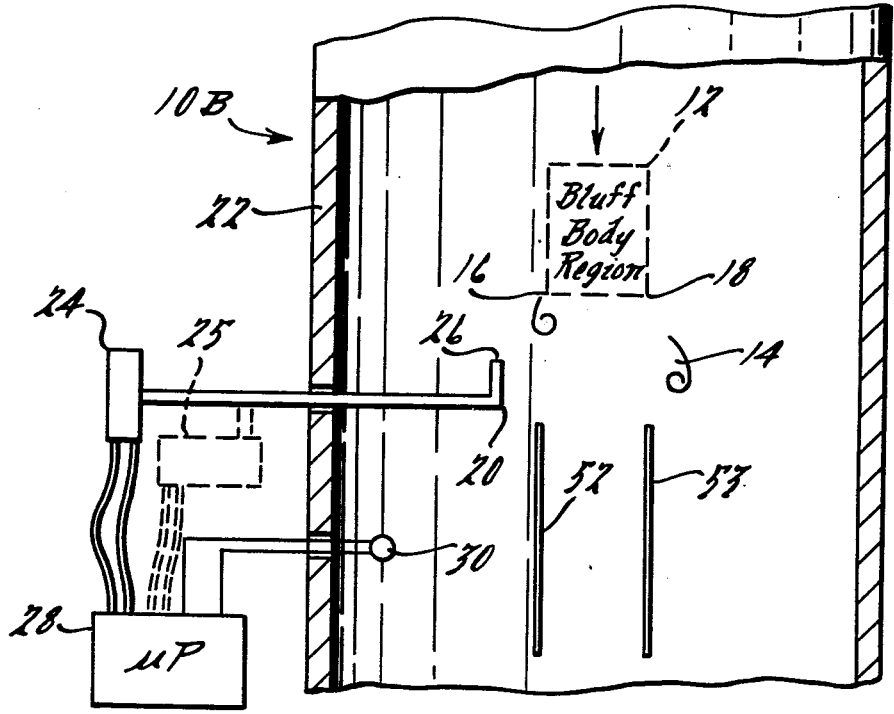
FIG. 2 is a view similar to FIG. 1 with a pair of spaced parallel plates positioned downstream of the vortex generator.

Referring to FIG. 2, a pair of parallel symmetric plates 52 and 53 are positioned downstream of vortex generating sides 16 and 18 of vortex generator 12. It has been found that the presence of plates 52 and 53 also improves the signal to noise ratio over that ratio which exists without plates 52 and 53.

Figure 3:
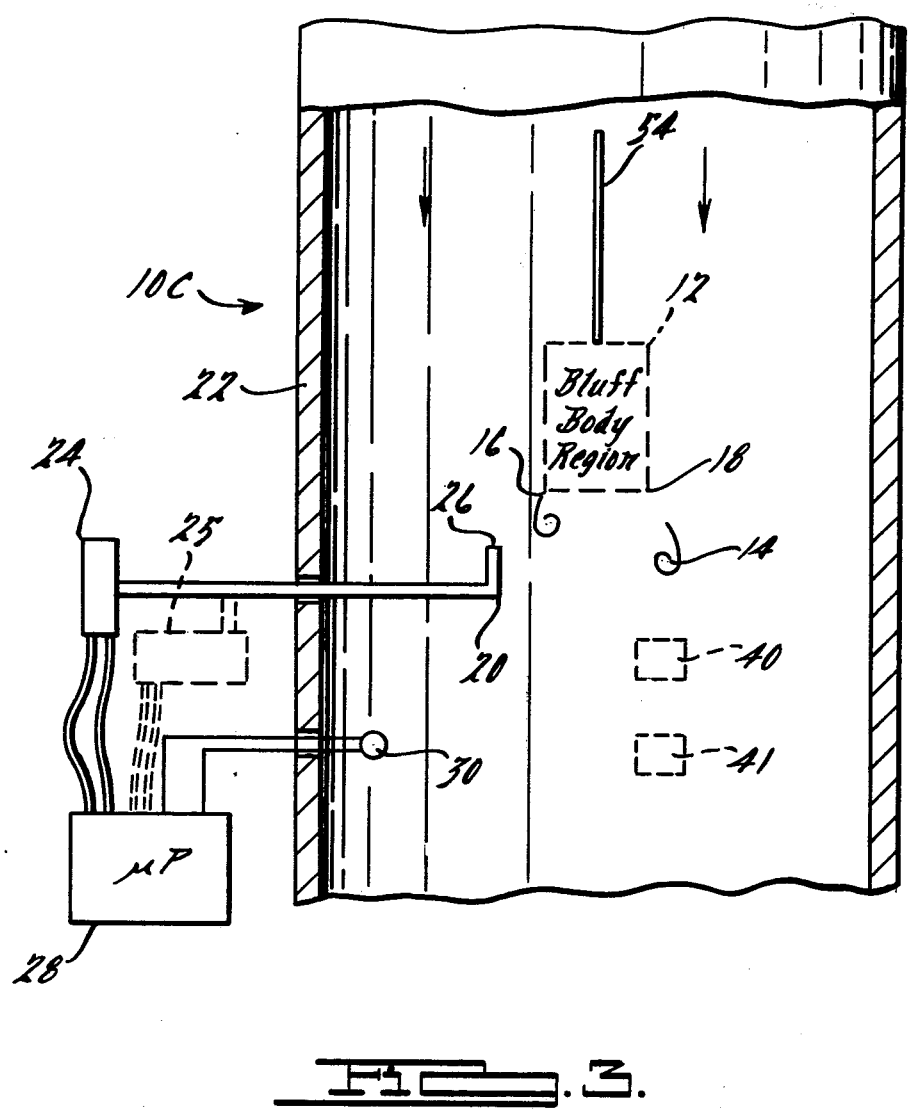
FIG. 3 is a view similar to FIG. 1 with a splitter plate positioned upstream of the vortex generator.

Referring to FIG. 3, a splitter plate 54 extends upstream from vortex generator 12 and is centered about the center line of vortex generator 12. The presence of splitter plate 54 also improves the signal to noise ratio.

Figure 4:
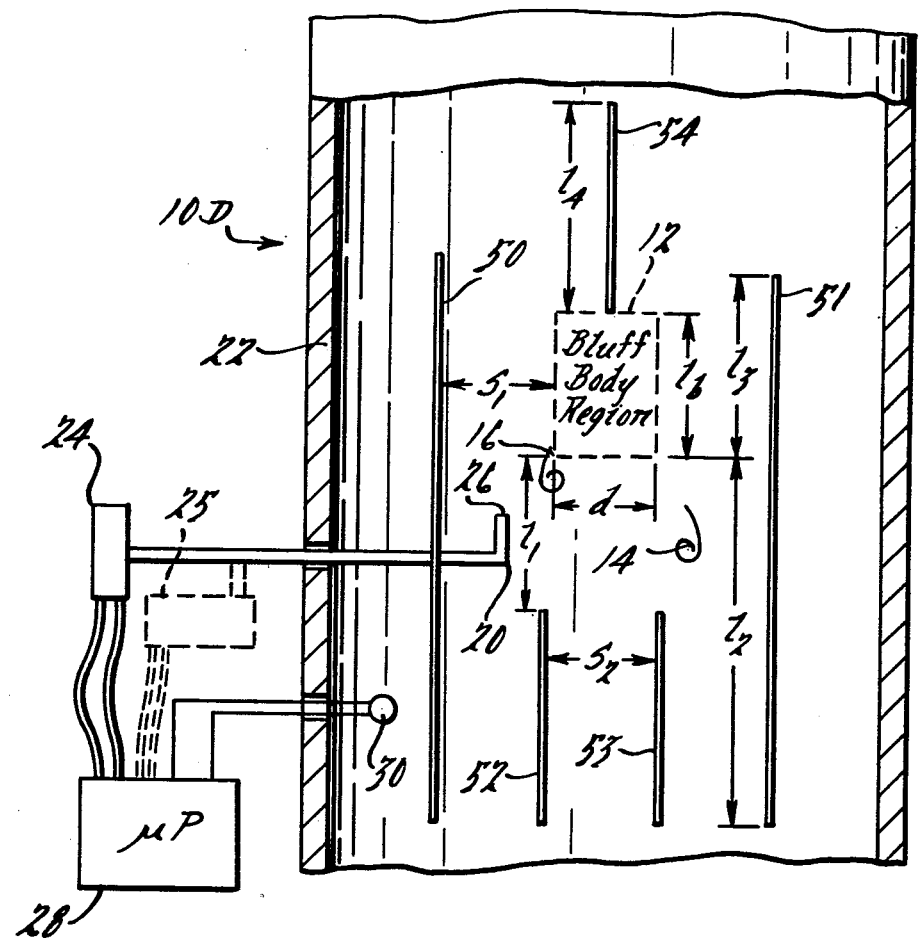
FIG. 4 is a view similar to FIG. 1 additionally including the plates shown in FIGS. 2 and 3.

Referring to FIG. 4, the combination of plates 50, 51, 52, 53 and 54 shown in FIGS. 1, 2 and 3 can be combined in mass air flow sensor 10D. Also shown in FIG. 4 are various dimension lines which can be used to describe advantageous configurations of the splitter plates. Dimension $s_1$ is the shortest distance from plate 50 to the vortex generator 12. Dimension $s_2$ is the shortest distance between parallel plates 52 and 53. Dimension d is the width of vortex generator 12 at the widest portion in a direction perpendicular to fluid flow. Dimension $l_b$ is the longitudinal extent of vortex generator 12 in the direction of fluid flow. Dimension $l_1$ is the shortest distance between the trailing edge of vortex generator 12 and the upstream edge of generator plate 53. Dimension $l_2$ is the distance from a transverse line established by the trailing edge of vortex generator 12 and the trailing edge of plate 51. Dimension $l_3$ is the distance from the leading edge of plate 51 to the transverse line established by the trailing edge of vortex generator 12. Dimension $l_4$ is the longitudinal extent of plate 54. It has been experimentally determined that the following ratios of dimensions are advantageous in improving the signal to noise ratio:

$l_1/d = 0.8$ to 2; $l_2/d = 1$ to 5
$l_3/l_b = 0.2$ to 2; $l_4/l_b = 0.1$ to 1
$s_1/d = 1.4$ to 2.0; $s_2/d = 0.9$ to 1.3

In operation, air flows within cylindrical wall 22 of mass air flow sensor 10 in the direction of the arrows. The air striking vortex generator 12 generates two wakes of vortices. The sequential forming of vortices alternates between side 16 and side 18 so that the vortices in the two streams are staggered. As the vortices approach opening 26 of pitot tube 20, a pressure disturbance takes place. That is, the swirling vortice produces a pressure variation with respect to the background pressure. Vortices can also be produced by a ring of vanes set at an angle to incoming air flow. Air flow downstream of the vanes has a cork screw or tornado like path. The troughs and ridges of the cork screw flow past pitot tube 20 and cause pressure variations.

A variation of static background pressure with respect to time may be due to such things as changing altitude. An oscillating pressure variation superimposed on the static pressure background indicates the occurrence of a pressure disturbance in the air flow. This pressure disturbance is due to a vortice adjacent opening 26 of pitot tube 20.

The pressure variation is transmitted along pitot tube 20 to pressure transducer 24 which produces electrical signals in response to both the background pressure and the superimposed frequency pulsations indicative of passing vortices. The electrical signal is coupled from transducer 24 to microprocessor 28 wherein the signal is processed to provide the separate indication of the background static pressure used in density calculations and the frequency of vortex shedding that is a velocity signal. That is, it is possible to compute just the velocity of the air flow or to compute the mass of the air flow when background pressure and fluid temperature are taken into account.

The separate indication of the background static pressure used in density calculations and the frequency of vortex shedding can also be obtained by placing a "tee" in the tubing carrying the signal from the pitot tube and connecting a slow response pressure sensor to one side of the "tee" to get the background static pressure and a microphone to the other side of the "tee" to get the vortex frequency which is proportional to the velocity, both of which provide the two separate electrical signals to the microprocessor 28. Referring to FIG. 1, a slow response pressure sensor 25 is shown in dotted outline connected to a leg of a "tee" of pitot tube 20. In such a combination, pressure transducer 24 has a relatively fast response to determine vortex frequency. When controlling air fuel ratios for internal combustion engines it is often desirable to know the mass flow, which is calculated from the equation:

$$m = \rho A V$$

m = mass flow rate: kg/s
$\rho$ = density: kg/m$^3$
A = cross sectional area: m$^2$
V = velocity: m/s The density is independent of pressure for incompressible fluids such as water, but dependent upon pressure, P, and temperature, T, for gases such as air, according to the equation:

$$\rho = P/RT$$

wherein R is a proportionally constant.

The pressure term used in the above equation is the background pressure obtained from microprocessor 28 by processing the electrical signal from transducer 24 or from slow response pressure sensor 25 which directly provides an electrical signal proportional to the background static pressure. A temperature sensor 30 can provide an electrical signal indicative of temperature to microprocessor 28. This temperature information can be incorporated in the calculation performed by microprocessor 28 to determine the mass of air flowing through mass air flow sensor 10.

If desired, a pressure transducer such as a microphone can be placed in the air flow stream downstream of vortex generator 12 and the pitot tube eliminated (see 40 of FIG. 3). Further, if desired, two pressure transducers or sensors (e.g., pitot tubes or microphones) can be placed downstream of the vortex generator (see 40 and 41 of FIG. 3). The two pressure transducers are advantageously in line with one another along the flow of the air and spaced from one another. Such an arrangement provides for a more accurate determination of the background static pressure and increased sensitivity for detection of individual vortices. The pressure variations sensed by the two pressure sensors would be applied to the microprocessor which is capable of processing the information.

Various modifications and variations will no doubt occur to those skilled in the various arts to which this invention pertains. For example, the particular positioning of the pressure sensor downstream of the vortex generator may be varied from that disclosed herein. The transverse extent of the plates (in a direction perpendicular to the plane of FIGS. 1-4) is advantageously at least as long as the vortex generating region of vortex generator 12. Typically, the plate would extend across the air flow path between wall 22. These and all variations which basically rely on the teachings through which this disclosure has advanced the art are properly considered within the scope of this invention.

We claim:

1. A device for measuring the velocity of a fluid comprising:
    vortex generating means positioned in a fluid stream so that vortices are formed in the wake of said generating means;
    a first pair of spaced parallel plates positioned on either side of said vortex generating means, said plates being aligned with the direction of fluid flow and having a portion positioned downstream of the longitudinal position of said vortex generating means for improving vortex detection by increasing a signal to noise ratio, said first pair of plates both extending from a first longitudinal position to a second longitudinal position downstream of said first longitudinal position; and
    a second pair of spaced parallel plates positioned downstream of said vortex generating means.

2. A device as recited in claim 1 wherein each one of said second pair of spaced parallel plates is generally positioned in a stream of vortices from said vortex generating means.

3. A device as recited in claim 1 further comprising a splitter plate extending upstream from said vortex generating means.

4. A device as recited in claim 3 having relative dimensions within the following ratios:
    $l_1/d = 0.8$ to 2; $l_2/d = 1$ to 5
    $l_3/l_b = 0.2$ to 2; $l_4/l_b = 0.1$ to 1
    $s_1/d = 1.4$ to 2.0; $s_2/d = 0.9$ to 1.3
wherein
    $l_1$ is the distance from the trailing edge of said vortex generating means to the leading edge of said second pair of plates;
    $l_2$ is the distance from the trailing edge of said vortex generating means to the trailing edge of said first pair of plates;
    $l_3$ is the distance from the trailing edge of said vortex generating means to the leading edge of said first pair of plates;
    $l_4$ is the longitudinal distance of said splitter plate;
    d is the width of said vortex generating means at the widest portion in a direction perpendicular to fluid flow;
    $l_b$ is the longitudinal extent of said vortex generating means;
    $s_1$ is the shortest distance from one of said first pair of plates to said vortex generating means; and
    $s_2$ is the shortest distance between said second pair of plates.

5. A device for measuring the velocity of a fluid comprising:
    vortex generating means positioned in a fluid stream so that vortices are formed in the wake of said generating means, said vortex generating means being generally elongated and extending perpendicular to the direction of fluid flow so as to generate Karman vortices;
    a splitter plate extending upstream from said vortex generating means, the ratio of the longitudinal extent of said splitter plate to the longitudinal extent of said vortex generating means being in the range of 0.1 to 1, said splitter plate being relatively thin in relation to its longitudinal extent; and
    a downstream pair of spaced parallel plates positioned generally in the stream of vortices from said vortex generating means, the ratio of the distance downstream of the leading edges of said downstream pair from the trailing edge of said vortex generating means to the width, d, of said vortex generating means at the widest portion in a direction perpendicular to fluid flow being in the range of 0.8 to 2, and the ratio of the separation between said downstream pair to d being in the range of 0.9 to 1.3.

6. A device for measuring the velocity of a fluid as recited in claim 5 wherein the transverse extent of said splitter plate and said downstream pair of plates, in a direction perpendicular to the direction of fluid flow, is at least as great as the transverse portion of said vortex generating means generating Karman vortices.

* * * * *